Patented May 17, 1927.

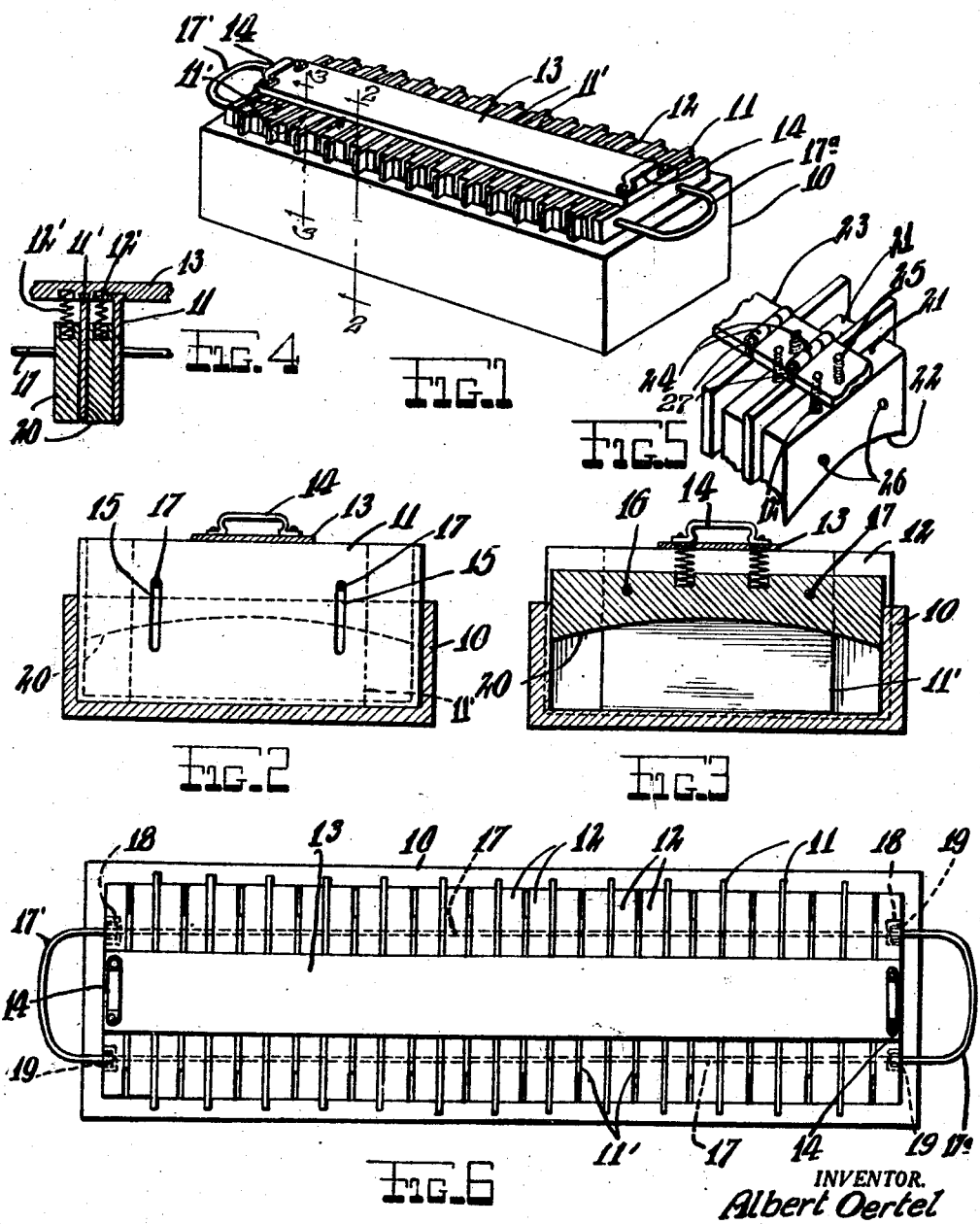

1,629,295

UNITED STATES PATENT OFFICE.

ALBERT OERTEL, OF RICHMOND HILL, NEW YORK.

COFFEE-RING-DOUGH DIVIDER.

Application filed March 12, 1925. Serial No. 14,943.

This invention relates to improvements in dough cutting devices, and it is the principal object of the invention to provide a device of simple and inexpensive construction, yet positively and effectively operating to cut a length of dough into a plurality of homogeneous parts.

Another object of the invention is the provision of a dough cutter having a plurality of knife blades carrying various designs on their lateral faces, and a plurality of blocks separating the knives and having their bottom edges concaved to give the upper face of the dough a convex form, as it is for instance preferred when baking zwieback, etc.

A further object of the invention is the provision of a dough cutter provided with a means for removably and exchangeably connecting the knives and blocks and holding them in intimate contact during use.

A still further object of the invention is the provision of a dough cutter, the knives of which are substantially larger than the separating blocks, and one equipped with means for simultaneously lifting the knives and blocks as a body from the dough container.

It is also one of the objects of my invention to provide a dough cutter having a plurality of blocks elastically suspended from a strip composed of a plurality of hingedly connected parts allowing a ready removal and exchange of the knife blades between two of the blocks.

These and other objects and advantages of my invention will become more fully known as the description thereof proceeds, and will then be specifically pointed out in the appended claims.

In the accompanying drawing, forming a material part of this disclosure:

Fig. 1 is a perspective view of a dough cutter constructed according to the present invention.

Fig. 2 is a cross-section on line 2—2 of Fig. 1 showing the knife blade.

Fig. 3 is a cross-section on line 3—3 of Fig. 1, showing a separating block.

Fig. 4 is a fragmentary sectional view showing the attachment of the knives.

Fig. 5 is a fragmentary perspective view of a modification of my dough cutter on a somewhat enlarged scale.

Fig. 6 is a top plan view of the device.

The dough cutter constructed according to my invention comprises a casing 10 of elongated rectangular contour made of any suitable material and dimensions.

In the casing or container 10 are fitted a plurality of steel knives 11, and 11′ each pair of which is separated by means of a block 12. Blocks and knives are held together at the top by means of a common strip or plate 13 secured to the end blocks, in order to enable their lifting out of the casing, box or container as a whole.

The board or strip 13 is equipped near its upper ends with convenient handles 14.

The knives are somewhat longer than the blocks, and are adapted to bear on their lateral faces designs of suitable configuration, and have each a pair of elongated slots 15, while the blocks 12 have perforations 16 in alignment with said slots, and rods 17 are passed through the slots and perforations in order to hold knives and blocks together. The ends of the rods are located in cavities in the outer faces of the end blocks, designated 18, and carry in said cavities adjustment and locking nuts 19 or the like, not interfering with the removal of the knives and blocks as a whole from the container. The ends projecting over the nuts are connected by means of the sleeve 17′. The shorter blocks have a concave lower edge, as indicated at 20, while the lower knife edges are straight and sharp.

The blocks 12 are each suspended from the underside of strip 13 by means of springs 12′, as indicated in Fig. 4, and the ends of the rods 17 are connected by means of handles 17ª or the like.

The operation of the device is apparently clear from the above description without further explanation, the box 10 is filled with dough to approximately its capacity, but not to its full capacity. Then the knives and blocks are introduced as a whole by means of the handles 17′ and 17ª and pressed downwardly to press the dough evenly. It will be clear that the elongated slots in the knives will permit a sliding of the rods 17 in slots 15 so that the knives may be pressed to reach the bottom of the container and will cut the dough into a plurality of homogeneous pieces each having the design of the knives impressed therein and having the width of the size of two blocks with a central cut produced by the narrower knives 11′, and the upper faces of the pieces will have a convex shape owing to the concave configuration of the bottom edges of the blocks. This apparatus will therefore be found extremely useful in the preparation of coffee rings and shaping of zwiebacks or the like for baking.

In the modified form of the invention illustrated in Fig. 5, the blocks 21 have also a concave bottom part 22, but are however connected at the top by a strip consisting of a plurality of sections 23 hinged together by means of hinges 24 or the like which are secured to the top of the blocks by a suitable fastening means 25. The blocks are secured to the strip by springs 12' or the like. The knives are introduced between each pair of blocks and held combined therewith by virtue of the rods passed through the openings 26 and their nuts in the manner as described with the preferred form.

The operation of the modified form is essentially the same as described above and it will be clear that the hinge connection will permit a ready removal and exchange of any number of the knives and blocks if so desired by withdrawing the hinge pintles 27, the rods 17, and replacing the desired sections.

Changes may be made in the construction such as fall within the scope of the invention defined by the appended claims, without departure from the spirit of the invention.

Having thus described my invention, what I claim as new and desire to protect by Letters Patent of the United States is as follows:—

1. A dough cutter comprising a dough container, a plurality of knives, blocks separating each pair of said knives, and having concave bottom edges, means for holding the knives and blocks assembled, comprising a common strip, springs for suspending said blocks from said strip and handles on said strip for permitting a lifting of knives and blocks simultaneously as a whole from said container after the cutting operation.

2. A dough cutter comprising a dough container, a plurality of perforated blocks having concaved bottom edges in said container, a plurality of knives having elongated slots, each pair of said knives separated by one of said blocks, means passing through the perforations and slots for removably assembling the knives and blocks, means for permitting the lifting of knives and blocks as a whole from said container, and means for elastically suspending said blocks from said last named means.

3. A dough cutter comprising a dough container, a plurality of perforated knives, and perforated blocks separating each pair of said knives, a strip composed of a series of hingedly connected parts, for allowing the lifting of knives and blocks as a whole from the container, and the removal and exchange of a desired number of knives.

4. A dough cutter comprising a dough container, a plurality of perforated blocks having a concave bottom in said container, a plurality of knives, each having two elongated slots, said knives having blades of a greater length than the blocks, each pair of said knives separated by one of said blocks, cavities formed in the end blocks at their outer faces, rods passed through the perforations of blocks and knives, connections between the ends of said rods adjusting and securing nuts at the outer ends of said rods, in said cavities, and means for allowing a lifting of said blocks and knives as a whole from said container.

In testimony whereof I have affixed my signature.

ALBERT OERTEL.